United States Patent Office 2,978,471
Patented Apr. 4, 1961

2,978,471
PHOSPHINYL ALKOXY SILANES

Frank Fekete, Verona, Pa., assignor to Union Carbide Corporation, a corporation of New York No Drawing. Filed Dec. 23, 1958, Ser. No. 782,382

5 Claims. (Cl. 260—448.8)

This invention relates to novel organosilicon compounds which contain phosphorus bonded to silicon through a divalent hydrocarbon group. My novel compounds are represented by the formula:

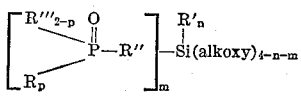

wherein R is a hydrocarbyl group, R' is a hydrocarbyl group and need not be the same throughout the same molecule, R'' is a divalent hydrocarbon group free of aliphatic unsaturation, e.g., methylene, —$CH_2$—, ethylene, —$CH_2CH_2$—, propylene, —$CH_2CH_2CH_2$—, octadecamethylene, —$(CH_2)_{18}$— phenylene, —$C_6H_4$—, cyclohexylene, —$C_6H_{10}$—, tolylene, $CH_3C_6H_3$=, naphthylene, —$C_{10}H_6$—, phenylenedimethylene, —$CH_2C_6H_4CH_2$—, and the like; R''' is a hydrogen atom or a hydrocarbyloxy group, i.e., R'O— where R' is as previously defined, m is an integer of 1 to 2, n is an integer from 0 to 2, n+m is an integer of 1 to 3, and p is an integer from 1 to 2. By the term "hydrocarbyl" as employed herein is meant a monovalent hydrocarbon group, i.e., a group composed of carbon and hydrogen. Examples of hydrocarbyl groups represented by R and R' are methyl, ethyl, propyl, butyl, stearyl, vinyl, allyl, oleyl, cyclohexyl, cyclopentyl, cyclohexenyl, cyclopentenyl, phenyl, tolyl, napthyl, phenylethyl, and the like.

My preferred compounds are those in which R, R' and R'' each individually contain from 1 to 18 carbon atoms and the alkoxy group, i.e., (alkoxy), contains from 1 to 6 carbon atoms. Illustrative of the novel compounds are (phenylphosphinylethyl)triethoxysilane, $$H(C_6H_5)\overset{O}{\overset{\|}{P}}(CH_2)_2Si(OC_2H_5)_3$$

(methylphosphinylstearyl) methyldiethoxysilane, $$H(CH_3)\overset{O}{\overset{\|}{P}}(CH_2)_{18}Si(CH_3)(OC_2H_5)_2$$

(stearylphosphinylcyclohexyl) ditolylpropoxysilane, $$H(C_{18}H_{37})\overset{O}{\overset{\|}{P}}C_6H_{10}Si(C_6H_4CH_3)_2(OC_3H_7)$$

(oleylphosphinylphenyl) vinyldibutoxysilane, $$H(C_{18}H_{35})\overset{O}{\overset{\|}{P}}C_6H_4Si(C_2H_3)(OC_4H_9)_2$$

(cyclohexylphosphinylpropyl) triethoxysilane,

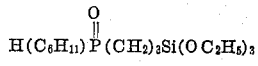

(distearylphosphinylethyl) triethoxysilane,

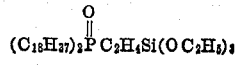

(methylstearoxyphosphinylphenyl) methyldibutoxysilane, $$(CH_3)(C_{18}H_{37}O)\overset{O}{\overset{\|}{P}}C_6H_4Si(CH_3)(OC_4H_9)_2$$

(diphenylphosphinylstearyl) phenyldiethoxysilane, $$(C_6H_5)_2\overset{O}{\overset{\|}{P}}C_{18}H_{36}Si(C_6H_5)(OC_2H_5)_2$$

(phenoxypropylphosphinylcyclohexyl) triethoxysilane, $$(C_6H_5O)(C_3H_7)\overset{O}{\overset{\|}{P}}C_6H_{10}Si(OC_2H_5)_3$$

(dicyclohexylphosphinylpropyl) vinyldiethoxysilane, $$(C_6H_{11})_2\overset{O}{\overset{\|}{P}}C_3H_6Si(C_2H_3)(OC_2H_5)_2$$

(methoxymethylphosphinylbutyl) triethoxysilane, $$(CH_3O)(CH_3)\overset{O}{\overset{\|}{P}}C_4H_8Si(OC_2H_5)_3$$

(cyclohexoxybutylphosphinylpropyl) tolyldipropoxysilane, $$(C_6H_{11}O)(C_4H_9)\overset{O}{\overset{\|}{P}}C_3H_6Si(C_6H_4CH_3)(OC_3H_7)_2$$

and the like.

Thus, included as novel classes of organosilicon compounds within the comprehension of this invention are organosilanes represented by the formulas:

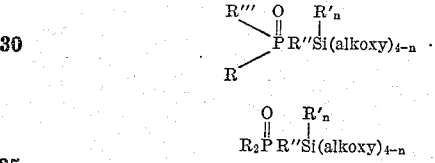

wherein R, R', R'', R''' and n are as previously defined.

These novel compounds are conveniently made by a process involving the reaction of a quinquevalent phosphorus compound, e.g., hydrocarbon-substituted phosphine oxides and phosphinates, having at least one hydrogen atom bonded to phosphorus, at least one hydrocarbyl group, i.e., R, bonded to phosphorus, and one oxo-oxygen atom, O=, bonded to phosphorus, the remaining valence of phosphorus being satisfied by a hydrocarbyloxy group or another hydrogen atom, with an organosilane having one halohydrocarbyl group, i.e., XR''— where R'' is as previously defined and X is a halogen atom, e.g., chloro, bromo, and iodo, bonded to silicon and at least one alkoxy group bonded to silicon, each remaining unfilled valence of silicon being satisfied by a hydrocarbyl group, i.e., R', or an alkoxy group. The hydrocarbon-substituted phosphine oxides and phosphinates employed as starting material in this process are represented by the formula:

wherein R, R', R''' and p are as previously defined. Illustrative hydrocarbon-substituted phosphine oxides and phosphinates are:

$(C_6H_5)_2P(O)H$, $(C_6H_5)(C_2H_5)P(O)H$, $(C_6H_5)P(O)H_2$
$(CH_5)(C_4H_9)P(O)H$, $(CH_3C_6H_4)P(O)H_2$
$(CH_3C_6H_4)(C_2H_5)P(O)H$, $(C_6H_5O)(C_2H_5)P(O)H$
$(C_6H_5)(C_8H_{17}O)P(O)H$, $(C_2H_5O)(C_6H_5)P(O)H$
$(C_4H_9O)(C_6H_5)P(O)H$, $(CH_3)P(O)H_2$
$(C_{18}H_{37})P(O)H_2$, $(C_{18}H_{35})P(O)H_2$, $(C_6H_{11})P(O)H_2$
$(C_{18}H_{37})_2P(O)H$, $(CH_3)(C_{18}H_{37}O)P(O)H$
$(C_6H_{11})_2P(O)H$, $(CH_3O)(CH_3)P(O)H$
$(C_6H_{11}O)(C_4H_9)P(O)H$ and the like.

Phosphorus compounds also useful as starting materials in the processes are the alkali metal salts of the above-described hydrocarbon-substituted phosphine oxides and phosphinates. These alkali metal salts are represented by the formula:

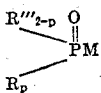

wherein R, R', R''' and p are as previously defined and illustrated and M is an alkali metal, for example, sodium, potassium, lithium, and caesium. Examples of alkali metal aslts of hydrocarbon-substituted phosphine oxides and phosphinates are:

$(C_6H_5)_2P(O)Na$, $(C H_5)(C_2H_5)P(O)Na$
$(C H_5)P(O)HNa$, $(C_6H_5)(C_4H_9)P(O)Li$
$(CH_3C_6H_4)P(O)HNa$, $(CH_3C_6H_4)(C_2H_5)P(O)K$
$(C_6H_5O)(C_2H_5)P(O)Cs$, $(C_6H_5)(C_8H_{17}O)P(O)K$
$(C_2H_5O)(C_6H_5)P(O)Li$, $(C_4H_9O)(C_6H_5)P(O)Na$
$(CH_3)P(O)HNa$, $(C_{18}H_{37})P(O)HK$, $(C_6H_{11})P(O)HK$
$(C_8H_{17})P(O)HK$, $(C_{18}H_{37})_2P(O)Li$
$(CH_3)(C_{18}H_{37}O)P(O)Cs$, $(C_6H_{11})_2P(O)Na$
$(CH_3O)(CH_3)P(O)K$, $(C_6H_{11}O)(C_4H_9)P(O)Na$ and the like. Preferred hydrocarbon-substituted phosphine oxides and phosphinates and alkali metal salts thereof employed as starting materials are those defined above wherein R and R' contain from 1 to 18 carbon atoms.

The nomenclature employed herein to designate phosphorus compounds is in accordance with the rules for naming compounds containing one phosphorus atom as approved by the General Nomenclature Committee of the Organic Division of the American Chemical Society as published in "Chemical and Engineering News," volume 30, No. 43, pp. 4515–4522, Oct. 27, 1952. The use of "(O)" in the formulas herein designates oxygen which is bonded to only phosphorus, e.g., P=O, and no differentiation is being made herein between →O (or semi-polar linkage) and =O (or double bond linkage).

Organosilanes employed as starting materials in this process are represented by the formula:

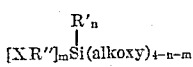

wherein R'', X and (alkoxy) are as previously defined and illustrated, and R' is as previously defined and illustrated, and need not be the same throughout the same molecule. Typical organosilanes are chloropropyltriethoxysilane, chlorophenyldimethylethoxysilane, chlorocyclohexylphenyldibutoxysilane, chlorostearyltripropoxysilane, chlorobutyldiethylmethoxysilane, chlorocyclopentylallyldipropoxysilane, chloromethyldicylcohexylbutoxysilane, bromonaphthylmethyldiethoxysilane, chloroethyltriethoxysilane, chlorostearylmethyldiethoxysilane, chlorocyclohexylditolylpropoxysilane, chlorophenylvinyldibutoxysilane, chlorophenylmethyldiethoxysilane, chlorostearyldiphenylethoxysilane and the like. Preferred organosilanes employed as starting materials are those as defined above wherein the hydrocarbyl group, R', and the divalent hydrocarbon group, R'', each have from 1 to 18 carbon atoms.

The process involves the metathesis reaction shown by the equation:

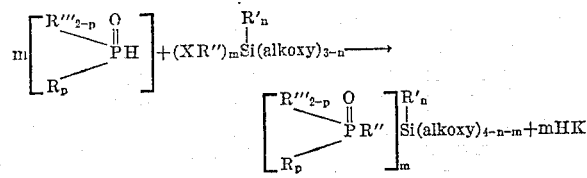

wherein X, R, R', R'' and R''' are as previously defined and need not be the same throughout the same molecule, m, n, p, and m+n are as previously defined, HX is a hydrogen halide. When a hydrocarbon-substituted phosphine oxide or phosphinate alkali metal salt is employed as the starting phosphorus compound an alkali metal halide, MX, where M and X are as previously defined, is formed instead of hydrogen halide in addition to the phosphorus-silicon product.

The process is carried out by bringing the organosilane and the phosphorus compound into reactive contact and continuously removing from the reaction zone the hydrogen or metal halide as it is formed in the reaction. Mole ratios of phosphorus compound and organosilane employed in the reaction are not narrowly critical. Stoichiometric amounts are preferred for efficient reaction and ease of product recovery. For example, one mole of phosphorus-bonded hydrogen or alkali metal is preferred for each mole of halogen, bonded through hydrocarbon to silicon, desired to be displaced. Other than stoichiometric amounts of starting materials can also be used. The temperature of the reaction is not narrowly critical and can be varied in accordance with the speed of reaction desired. Temperatures of 75° C. to 300° C. are advantageous in providing a smooth reaction and high yields of products. Temperatures below 75° C. can be employed if desired but the reaction rate is slowed. Temperatures above 300° C. can also be employed but the likelihood of reduced yields is greater. My process is advantageously carried out at atmospheric pressure or at whatever pressures exist in the particular reaction vessel employed without purposely applying increased or reduced pressures. Sub-atmospheric or super-atmospheric pressures can be employed, however, if desired. Where one or more of the starting materials are gaseous at the chosen reaction temperature, super-atmospheric pressures and a closed reaction vessel are conveniently employed to bring the starting materials into reactive contact. No catalysts are required although suitable catalysts such as tetramethyl ammonium chloride, trimethyl benzoyl ammonium chloride, and the like, can be employed for whatever advantage they may provide. Solvents also are not required but are useful in simplifying the handling of the reaction mixture. If a solvent is employed, xylene, toluene, benzene, methyl ethyl ketone, dimethyl formamide, and the like are recommended. A solvent which dissolves the starting materials and the products but does not dissolve the formed hydrogen halide or alkali metal halides is particularly useful in removing the hydrogen or alkali metal halides from the reaction zone. Such solvents include xylene, toluene, benzene, dimethyl formamide, and the like. The formed hydrogen halide or alkali metal halide is continuously removed from the reaction zone by any suitable method or technique of which many are known. The formed alkali metal halides are most effectively removed by precipitation which can be assured by employing a solvent as listed above which dissolves the silicon compound and phosphorus compound starting materials and the phosphorus-silicon product but does not dissolve the formed alkali metal. A particularly suitable technique for removing formed hydrogen halide is to employ a hydrogen halide acceptor, such as the tertiary amines, added to the reaction mixture in the approximate stoichiometric amounts based on the amount of hydrogen halide expected to be formed in the reaction. Triethyl amine, pyridine, tributyl amine, and the like are some of the excellent hydrogen halide acceptors. Excess amounts of the acceptor over and above the stoichiometric amount is preferably employed to assure the substantially complete removal of the hydrogen halide. Primary amines, secondary amines, and ammonia can also be employed in controlled amounts as hydrogen halide acceptors. For example, the primary and secondary amines and ammonia can be continuously or intermittently added (e.g., by titration) as the reaction proceeds in such quantities that maintain the reaction mixture slightly acidic to slightly basic. The hydrogen halide can even be continuously stripped by boiling it from the reaction mixture as it is formed employing techniques within the chemist's skill. Although it is not necessary in order to obtain a product, it is preferable for best yields of product, no matter what particular technique is employed in removing hydrogen halide to maintain the pH of the system above about 6 to prevent decreased yields due to possible side reactions involving the formed hydrogen halide, and below about 8 when strongly basis acceptors or other materials are employed to prevent possible side reactions involving the silicon compound in the event moisture is also present.

Alternatively, my novel organosilicon compounds are also made by an addition reaction of hydrocarbon-substituted phosphine oxides and phosphinates, as described above, having 1 or 2 hydrogens bonded to phosphorus with olefinically-unsaturated organosilanes having at least one olefinically unsaturated hydrocarbon group bonded to silicon. Olefinically-unsaturated organosilanes are represented by the formula:

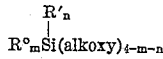

wherein $n$, $m$ and $m+n$ are as previously defined, R' is as previously defined but is free of aliphatic unsaturation, and R° is an olefinically unsaturated hydrocarbyl group, e.g., vinyl, allyl, oleyl, cyclohexenyl, styryl, and the like, and include vinylphenyldipropoxysilane, allyltriethoxysilane, oleyldicyclohexylbutoxysilane, cyclohexenyldimethylmethoxysilane, styryltriethoxysilane, and the like. The addition is carried out in the presence of a free radical-forming catalyst such as di-tertiarybutyl peroxide, dibenzoyl peroxide, dicumyl peroxide, and the like. The reaction temperature is within the range from 50° C. to 180° C. Superatmospheric pressures are not necessary although they can be employed, if desired, and solvents are not particularly necessary. The addition reaction is represented by the equation:

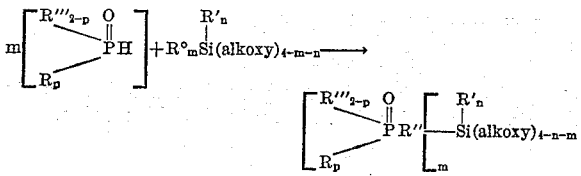

wherein R, R', R", R''' and R° are as previously defined and need not be the same throughout the same molecule, $m$, $n$, $p$ and $m+n$ are as previously defined.

Other processes can be employed for making my novel organosilicon compounds, for example, phosphorus compounds of the formula:

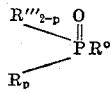

wherein R° and $p$ are as previously defined, R and R' are as previously defined but are free from aliphatic unsaturation, are reacted with silanic hydrogen containing organosilanes of the formula:

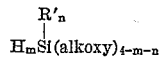

wherein R' is as previously defined and need not be the same throughout the same molecule and $m$, $n$ and $m+n$ are as previously defined. The reaction is carried out in the presence of di-tertiary-alkyl peroxide, e.g., di-tertiary-butyl peroxide, and at a temperature in the range of 100 to 250° C. Superatmospheric pressures and solvents are not required although they may be desired. The reaction is represented by the equation:

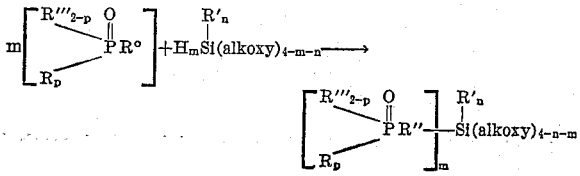

wherein R, R', R", R''' and R° are as previously defined but need not be the same throughout the same molecule, and $m$, $n$ and $m+n$ and $p$ are as previously defined. R and R' are free of aliphatic unsaturation.

The product is isolated by any suitable procedure many of which are commonly employed by persons skilled in the art. For example, the distillable products, i.e., in general the silanes, are most readily isolated and purified by fractional distillation. The high boiling products, i.e., in general the siloxanes, are most readily isolated by removing foreign material, e.g., unreacted starting materials and by-products, by distillation, washing with solvents or filtering or any combination of these procedures. Other isolation procedures commonly employed by skilled chemists, e.g., recrystallization procedures for solid crystalling products, can also be used for isolating the products disclosed herein.

The novel organosilicon compounds of this invention are useful as additives to known silicone oils and greases for improving the lubricity of such oils and greases. My novel organosilicon compounds are hydrolyzable and can be hydrolyzed and condensed alone or in admixture with other hydrolyzable organosilanes having at least one hydrolyzable group, e.g., halogen, acyloxy, and alkoxy, bonded to silicon and no other groups than hydrocarbyl bonded to silicon. Hydrolysis and condensation techniques known to those skilled in the art of silicon chemistry are employed. The polysiloxanes obtained by hydrolysis and condensation as described above are useful in the form of resins for providing protective coatings to metals such as iron, steel, aluminum and the like, and in the form of linears and oils as lubricants and lubricant additives for improving lubricity.

The following examples are presented.

Example 1

To a 500 cubic centimeter flask equipped with dropping funnel, mechanical stirrer, reflux condenser, and thermometer was added octylphenylphosphine oxide, $C_8H_{17}(C_6H_5)P(O)H$, 0.2 mole, 50.8 grams. The phosphine oxide was heated to 140° C. A solution of vinyltriethoxysilane (0.2 mole, 38.0 grams) and di-tertiary butyl peroxide (3.0 grams) was added dropwise while the reaction mixture was maintained at 140° C. to 155° C. Finally, the reaction mixture was heated to 160° C. and maintained at this temperature for 1 and ½ hours. It was then fractionated through "Heli-Pak" in a 12 inch x ¾ inch column. The total weight of all the fractions which was the desired product, (octylphenylphosphinylethyl) triethoxysilane, was 60.9 grams, which represents a 69 percent yield. (Elemental analysis confirmed the chemical composition of the product.) The refractive index, $n_D{}^{25}$, of this product was 1.4802 to 1.4770. The boiling point of (octylphenylphosphinylethyl)triethoxysilane was found to be 211° C. to 215° C. at 1 mm. Hg pressure.

Example 2

A 300 milliliter autoclave was charged with gamma-(phenylethylphosphino)propyltriethoxysilane, $$C_6H_5(C_2H_5)P(CH_2)_3Si(OC_2H_5)_3$$

(25.6 grams, 0.075 mole) and benzene (40 milliliters), then capped and tested for leaks at 400 p.s.i. No leaks were observed. The autoclave was pressurized to 275 p.s.i. with oxygen. It was placed in a rocker and shaken 15 minutes at room temperature. It was again pressurized with oxygen to 275 p.s.i. (5 p.s.i. drop through solubility). Rocking was continued at 25° C. for 14 hours. A pressure drop of 20 p.s.i. was observed. Heat was applied slowly to the autoclave to 60° C. over 4 hours. The vessel was allowed to rock an additional 3 hours thereafter. The pressure at 25° C. on the gage was 225 p.s.i. The calculated theoretical drop was 50 p.s.i. The vessel was vented slowly and the product residue transferred to a 100 milliliter round-bottomed flask and distilled in vacuo through a 15 inch insulated Vigreaux column. Fifteen grams (represented a 58 mole percent yield) of gamma - (phenylethylphosphinylpropyl)triethoxysilane, $C_6H_5(C_2H_5)P(O)(CH_2)_3Si(OC_2H_5)_3$, having an index of refraction, $n_D^{25}$, of 1.4848, was obtained. Elemental and infra-red analyses confirmed the chemical composition and structure of the product.

*Example 3*

Stearylphosphine, $C_{18}H_{37}PH_2$, is prepared by reacting white phosphorus, $P_4$, aqueous sodium hydroxide, 6NaOH, and stearyl iodide, $2C_{18}H_{35}I$, in an autoclave at 150° C. to 200° C. for several hours. The resultant $C_{18}H_{37}PH_2$ is produced in about a 30 percent yield along with NaI and $Na_2HPO_3$.

The $C_{18}H_{37}PH_2$ phosphine is diluted in xylene and cooled to 0° C. and a mole of Na is added. The system is brought slowly up to room temperature under a blanket of anhydrous $N_2$, then heated to 120° C. for an hour and then cooled down to 0° C. To this mixture now containing the $C_{18}H_{37}PHNa$ is added 1 mole of $CH_3Cl$ and the mixture allowed to warm to room temperature. The autoclave is heated at 110° C. for several hours to give $(CH_3)(C_{18}H_{37})PH$ and a slurry of NaCl. Another mole of Na is added at 0° C., the mixture of ingredients allowed to come to room temperature, and then heated to 112° C. for 1 hour giving $(CH_3)(C_{18}H_{37})PNa$. To this solution upon cooling to 10° C. is added 1 mole of

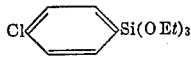

and the reactants are heated to 130° C. for several hours. A slurry of NaCl forms and the resultant product

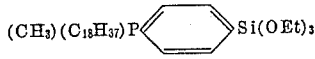

is obtained in about 30 percent yield. The product

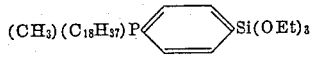

is oxidized under pressure with $O_2$ to produce

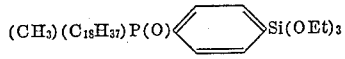

in about 10 percent yield.

*Example 4*

To a flask equipped with a stirrer, addition funnel and reflux condenser, was charged phenylphosphine, $C_6H_5PH_2$, (43 grams, 0.39 mole) and the system placed under a nitrogen atmosphere. The phosphine was chilled to —40° C. and sodium (9.0 grams, 0.39 mole) was added through the addition funnel in the form of a dispersion (40 percent sodium by weight in toluene) in a dropwise fashion over a period of 20 minutes. The reaction mixture was allowed to warm to 0° C. and dimethyl "Cellosolve" (10 ml.) was added, whereupon a vigorous reaction ensued. The reaction mixture was again chilled to —40° C. and stirred for 1 hour. Sodium phenyl phosphine was thus formed. The addition funnel was charged with ethyl bromide (42.5 grams, 0.39 mole) and the reagent added dropwise at —40° C. over 20 minutes. The reaction ensuing was exothermic. A yellow-green phosphinide color was observed. This changed to a water-white phosphine color when the mixture was allowed to warm up to 0° C. over 1 hour. Phenylethylphosphine, $C_6H_5(C_2H_5)PH$, was thus formed. A sodium dispersion (9.0 grams, sodium, 40 percent by weight in toluene) and dimethyl "Cellosolve" (100 ml.) were charged to the addition funnel and added dropwise to the contents of the flask which were chilled to —40° C. Addition was completed over a period of 20 minutes and sodium phenylethylphosphine, $C_6H_5(C_2H_5)PNa$ was formed. Stirring was continued for about 1 hour after completion of addition. The reaction mixture was allowed to warm up to 25° C. The addition funnel was charged with gamma - chloropropyltriethoxysilane (99 grams, 0.41 mole) and the reaction mixture was chilled to 0° C. Addition was conducted in a dropwise fashion over a period of 20 minutes. The reaction mixture was stirred for 1 hour after completion of addition and was then allowed to warm up to 25° C. The reaction mixture was heated at 100° C. for 1.5 hours to effect complete reaction and and then cooled to room temperature (25° C.). The water-white liquid phase which had formed was decanted through glass wool to remove colloidal salts. The product was dried by distillation and 155 grams of material was obtained. This material was further distilled in vacuo through a 25 inch insulated Vigreaux column. A light yellow liquid fraction weighing 32.5 grams and having an index of refraction, $n_D^{25}$, of 1.4840 was obtained and analyzed. This fraction had a boiling point of 129° C. to 132° C. at 0.55 mm. Hg pressure. The formula,

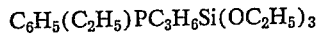

was confirmed for the fraction by infra-red analysis, elemental analysis and a comparison of calculated and measured molar refractions. Yield of product was 32 mole percent.

*Example 5*

The procedure described in Example 1 is conducted employing, however, phenyl methylphosphinate, $$(C_6H_5O)(CH_3)P(O)H$$

instead of octylphenylphosphine oxide and cyclohexenyl-(dimethyl)methoxysilane instead of vinyltriethoxysilane. There is obtained (phenoxymethylphosphinylcyclohexyl)-(dimethyl)methoxysilane,

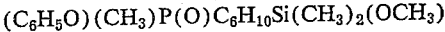

*Example 6*

Sodium allylphosphine oxide,

is prepared by following the procedure described in Example 3 employing, however, allylphosphine oxide,

instead of stearylphosphine. One mole of the sodium allylphosphine oxide is then reacted with delta-chlorobutyl(phenyl)dipropoxysilane employing the procedures in Example 3 of reacting sodium methylstearylphosphine and chlorophenyltriethoxysilane. A slurry of NaCl is formed and the product obtained is (allylphosphinyl-butyl)(phenyl)dipropoxysilane,

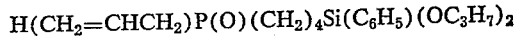

What is claimed is:

1. As a novel composition of matter the organosilanes represented by the formula:

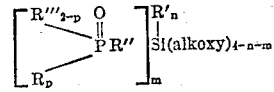

wherein R is a hydrocarbyl group, R' is a hydrocarbyl group and need not be the same throughout the same molecule, R" is a divalent hydrocarbon group free of aliphatic unsaturation, R'" is a member from the class consisting of hydrogen and a hydrocarbyloxy group, $m$ is an integer from 1 to 2, $n$ is an integer from 0 to 2, $n+m$ is an integer from 1 to 3 and $p$ is an integer from 1 to 2.

2. As a novel composition of matter the organosilanes represented by the formula:

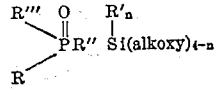

wherein R is a hydrocarbyl group, R' is a hydrocarbyl group and need not be the same throughout the same molecule, R" is a divalent hydrocarbon group free of aliphatic unsaturation, R''' is a member from the class consisting of hydrogen and a hydrocarbyloxy group, and $n$ is an integer from 0 to 2.

3. As a novel composition of matter the organosilanes represented by the formula:

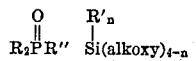

wherein R is a hydrocarbyl group, R' is a hydrocarbyl group and need not be the same throughout the same molecule, R" is a divalent hydrocarbon group free of aliphatic unsaturation, and $n$ is an integer from 0 to 2.

4. As a novel composition of matter, (octylphenylphosphinylethyl)triethoxysilane.

5. As a novel composition of matter, gamma-(phenylethylphosphinylpropyl)triethoxysilane.

References Cited in the file of this patent

UNITED STATES PATENTS

| | | |
|---|---|---|
| 2,768,193 | Gilbert | Oct. 23, 1956 |
| 2,843,615 | Linville | July 15, 1958 |

UNITED STATES PATENT OFFICE
CERTIFICATION OF CORRECTION

Patent No. 2,978,471                          April 4, 1961

Frank Fekete

It is hereby certified that error appears in the above numbered patent requiring correction and that the said Letters Patent should read as corrected below.

Column 1, line 55, for the right-hand portion of the formula reading "$(OC_2H_5 \ _2$" read -- $(OC_2H_5)_2$ --; column 2, line 1, for "methyldibutoxysilone" read -- methyldibutoxysilane --; line 62, for "$(C \ H_5)$" read -- $(C_6H_5)$ --; column 3, line 12, for "aslts" read -- salts --; lines 15 and 16, for "$C \ H_5)$", each occurrence, read -- $(C_6H_5)$ --; same column 3, line 66, for the right-hand portion of the equation reading "3-n" read -- 4-m-n- --; column 5, line 1, for "basis" read -- basic --; lines 40 to 43, in the formula the second bracket should be reversed; column 6, line 16, for "crystalling" read -- crystalline --.

Signed and sealed this 17th day of April 1962.

(SEAL)
Attest:

ESTON G. JOHNSON
Attesting Officer

DAVID L. LADD
Commissioner of Patents